United States Patent [19]

Tanaka et al.

[11] Patent Number: 4,998,245

[45] Date of Patent: Mar. 5, 1991

[54] INFORMATION TRANSMISSION SYSTEM HAVING COLLECTIVE DATA TRANSMISSION AND COLLECTION DEVICES

[75] Inventors: Shotaro Tanaka, Neyagawa; Yukiko Ono, Yawata; Masao Ikezaki; Takeshi Goto, both of Hirakata, all of Japan

[73] Assignee: Matsushita Electric Industrial Co., Ltd., Osaka, Japan

[21] Appl. No.: 282,570

[22] Filed: Dec. 12, 1988

[30] Foreign Application Priority Data

Dec. 17, 1987 [JP] Japan ................................. 62-319431
Sep. 6, 1988 [JP] Japan ................................. 63-222711

[51] Int. Cl.⁵ ............................. H04J 3/02; H04J 3/24
[52] U.S. Cl. ............................... 370/85.100; 370/94.1; 370/85.7; 370/95.1; 340/825.08
[58] Field of Search ................. 370/94, 96, 85, 89, 370/94.1, 85.1, 85.7, 94.3, 95.1; 340/825.08, 825.5, 825.51

[56] References Cited

U.S. PATENT DOCUMENTS

| 4,584,680 | 4/1986 | Carter et al. | 370/96 |
| 4,760,572 | 7/1988 | Tomikawa | 370/94 |
| 4,807,224 | 2/1989 | Naron et al. | 370/94 |
| 4,809,268 | 2/1989 | Tejima et al. | 370/96 |
| 4,818,984 | 4/1989 | Chang et al. | 370/94 |

Primary Examiner—Douglas W. Olms
Assistant Examiner—Wellington Chin
Attorney, Agent, or Firm—Stevens, Davis, Miller & Mosher

[57] ABSTRACT

An information transmission system having a plurality of communication control units connected to one another through an information transmission path in a communication network comprises devices for collectively transmitting and collecting broadcasting information to and from selected plural communication control units by sending one information message.

6 Claims, 15 Drawing Sheets

| MA | SA | CF | DATA FIELD |
|---|---|---|---|
| SOURCE ADDRESS | FFF | MEMORY ADDRESS DESTINATION | ADDRESS VALUE |

| MA | SA | CF | DATA FIELD || |
|---|---|---|---|---|---|
| | | | DATA 1 | | DATA 2 | |
| SOURCE ADDRESS | FFF | DATA READ-OUT | UNIT ADDRESS ① | SEND-BACK INFORMATON a | UNIT ADDRESS ② | SEND-DACK INFORMATION b |

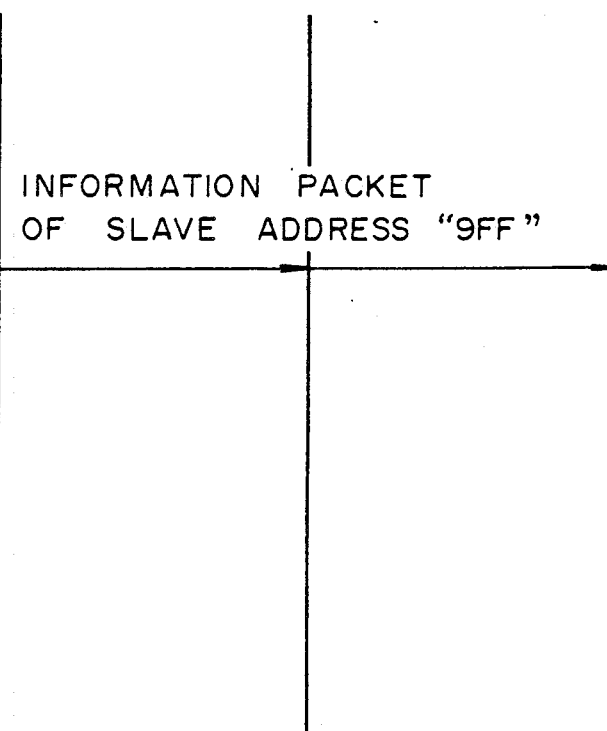

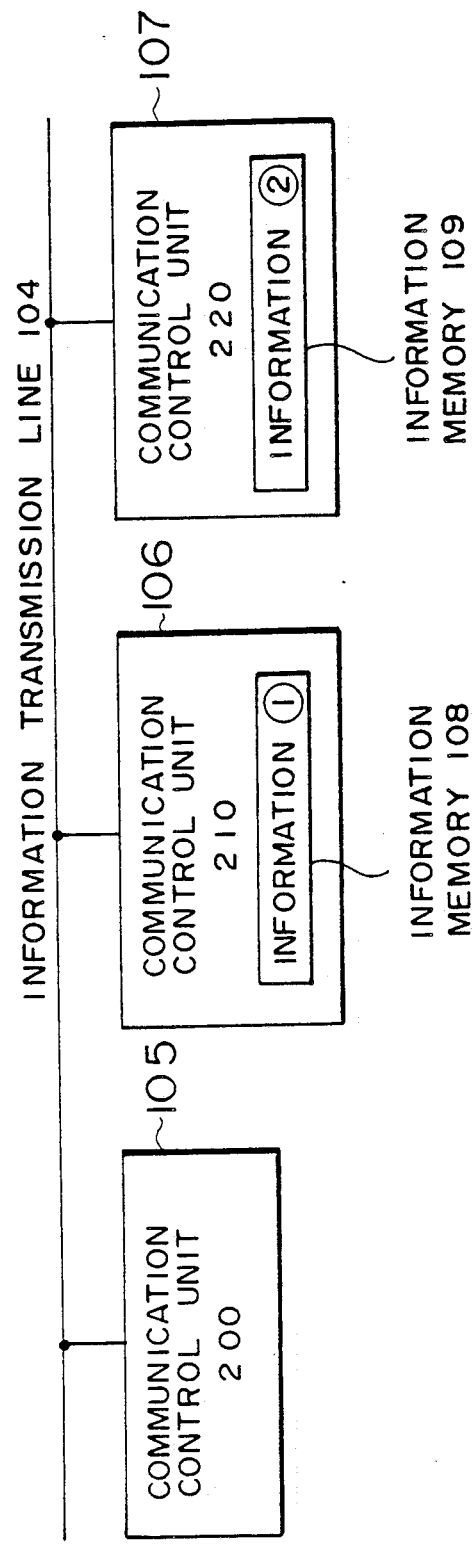

| | MA | SA | CF | DATA FIELD |
|---|---|---|---|---|
| FIG. 13a | 200 | 210 | MEMORY ADDRESS DESIGNATION | ADDRESS VALUE |
| FIG. 13b | 200 | 210 | DATA READ-OUT | INFORMATION ① |
| FIG. 13c | 200 | 220 | MEMORY ADDRESS DESIGNATION | ADDRESS VALUE |
| FIG. 13d | 200 | 220 | DATA READ-OUT | INFORMATION ② |

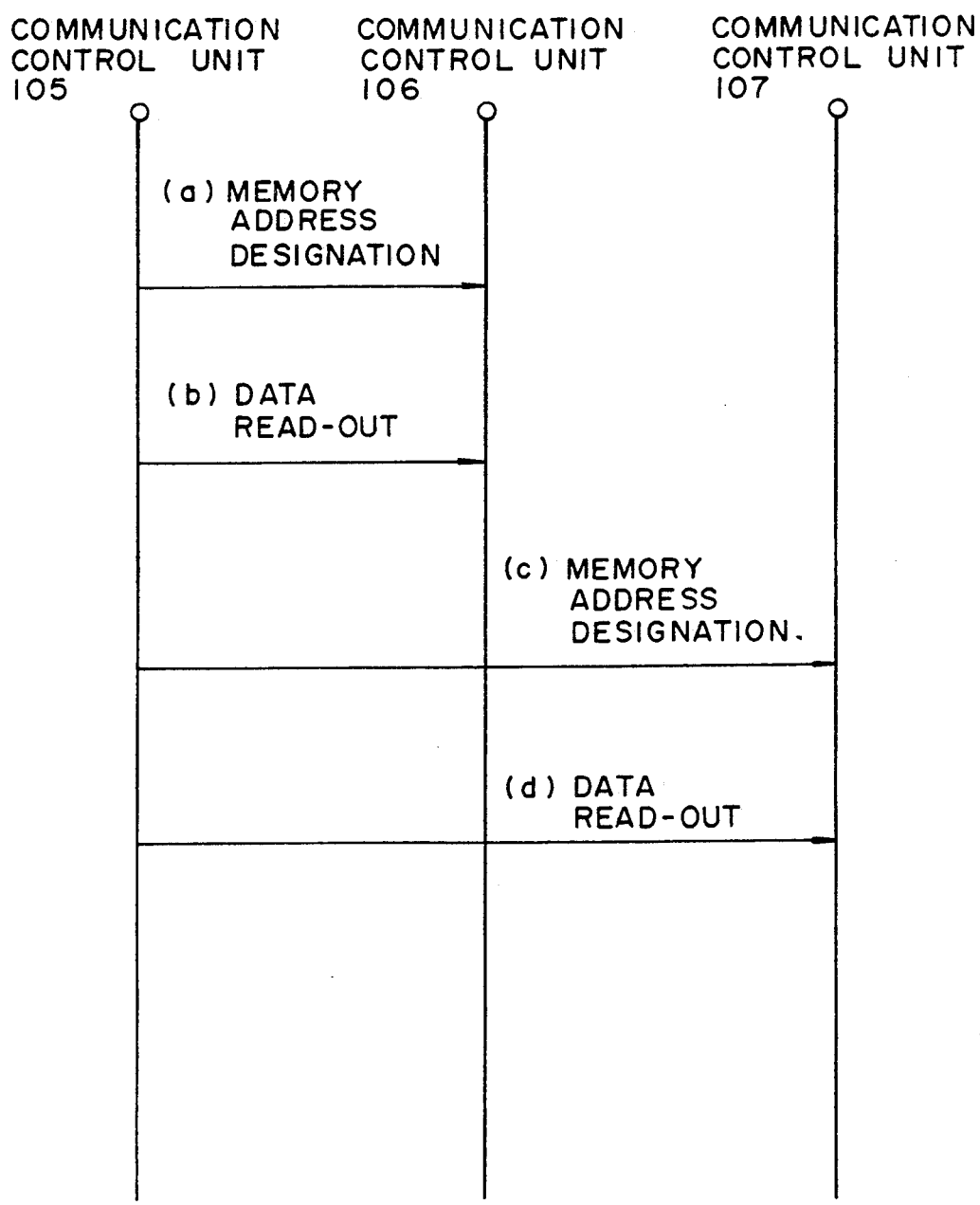

FIG. 17a

| MA | SA | CF | DATA FIELD |
|---|---|---|---|
| 200 | FFF | MEMORY ADDRESS DESIGNATION | ADDRESS |

FIG. 17b

| MA | SA | CF | DATA FIELD | | | |
|---|---|---|---|---|---|---|
| | | | DATA 1 | | DATA 2 | |
| 200 | FFF | DATA READ-OUT | 210 | 02 / INFORMATION ① | 220 / 03 | INFORMATION ② |

INFORMATION TRANSMISSION SYSTEM HAVING COLLECTIVE DATA TRANSMISSION AND COLLECTION DEVICES

BACKGROUND OF THE INVENTION

The present invention relates to a method for collectively transmitting and collecting communication information in an information transmission system, and a system using the method.

As the information transmission system, a digital data bus (D²B) for communicating information between audio/video equipments has been known (IEC "84 Secretariat 47 Draft Peritelevision/D²B"). The conventional D²B information transmission system has a function to communicate one information message from one source communication control unit connected to an information transmission line to one destination communication control unit connected to the information transmission line in one-to-one communication fashion.

FIG. 8 shows a block diagram of a prior art information transmission system. Numeral 101 denotes an information transmission line for transmitting information messages, and numerals 102 and 103 denote communication control units for mutually communicating through the information transmission line.

FIG. 9 shows a format of a conventional information message. It comprises a start bit indicating the beginning of the information message, a master address indicating a source address, a parity bit indicating a parity of the master address, a slave address indicating a destination address, a parity bit and an ACK bit indicating a parity of the slave address, a control field indicating an attribute of the information message, a parity bit indicating a parity of the control field, and a data field indicating transmission information. The parity bit is used for parity check. The ACK bit informs to the transmitter whether the receiver has normally received the data or not. If the receiver normally receives, it sends back an acknowledge (ACK) signal, and if it incorrectly receives, it sends back a non-acknowledge (NACK) signal.

A communication method in the above system is explained. When an information message is to be sent from the communication control unit 102 to the communication control unit 103 in FIG. 8, the communication control unit 102 first send the start bit, and then send a unit address of the communication control unit 102 as the master address, the parity bit thereof, a unit address of the communication control unit 103 as the slave address, and the parity bit thereof. The unit addresses of the communication control units 102 and 103 are uniquely present on the information transmission line 101. When the communication control unit 103 detects the start bit, it starts to receive the information message to receive the master address, the parity bit thereof, the slave address and the parity bit thereof. If the information message is normally received and the slave address coincides with the unit address of the communication control unit 103, the communication control unit 103 determines that the information massage is addressed to its own unit and sends back the ACK bit. If it does not correctly receive the information message by asynchronization or parity error during the receiving operation, or if the slave address does not coincide with the unit address of its own, it sends back the NACK bit. If the communication control unit 103 is not connected to the information transmission line 1, the ACK bit is not sent and no response is sent. The communication control unit 102 determines it as if it received the NACK bit. When the communication control unit 102 receives the NACK bit, it stops to send the information message. When the communication control unit 102 receives the ACK bit, it further sends the control field and the parity bit thereof. When the communication control unit 103 correctly receives the control field and the parity bit thereof, or when it is able to execute the operation designated by the control field in the receiving station, it sends back the ACK signal. If it does not correctly receive the control field and the parity bit thereof because of asynchronization or parity error during the receiving operation, or if it cannot execute the operation designated by the received control field, it sends back the NACK signal to the communication control unit 102. When the communication control unit 102 receives the NACK signal, it stops to send the information message. When it receives the ACK signal, it further transmits the data field to the communication control unit 103.

Collective collection of information by one of the communication control units connected to the information transmission line is now considered. In a bus type communication network shown in FIG. 12 in which a plurality of communication control units are interconnected through an information transmission line, let us assume that a communication control unit 105 receives information ① of a communication control unit 106 and information ② of a communication control unit 107 through an information transmission line 104. Numerals in < > in the respective communication control units represent unit addresses on the information transmission line assigned to the respective communication control units. A communication message and a communication sequence therefor are shown in FIGS. 13 and 14, respectively. The communication control unit 105 designates an address of a memory, in which the information to be read from the communication control unit 106 is stored, by a communication message shown in FIG. 13a, in which MA denotes a master address which is a source address, and SA denotes a slave address which is a destination address. The unit address <200> of the communication control unit 105 and the unit address <210> of the communication control unit 106 are designated. CF denotes a control field which represents an attribute of the message. Specifically, it has a code which indicates the attribute of the memory address designation. In the following data field, an address of the memory in which the information to be read is stored is written. The communication control unit 105 then reads the information from a memory 108 of the communication control unit 106 by a message shown in FIG. 13b, in which MA contains the unit address <200> of the communication control unit 105, AS contains the unit address <210> of the communication control unit 106, and CF contains a code indicating the read-out of the data. When the communication control unit 106 receives the code, it detects the data read-out code and sends back the information 1 stored at the address designated by the memory address designation message of FIG. 13a, as a data field of the data read-out message of FIG. 13b. When the communication control unit 105 reads the information 2 from the information memory 109 of the communication control unit 107, it reads the information by a memory address designation message of FIG. 13c and a data read-out message of FIG. 13d. FIG. 14 shows a communication sequence in reading the data by the messages of FIGS. 13a, 13b, 13c and 13d.

In the prior art communication control method mentioned above, when one communication control unit communicates the same information with a plurality of communication control units, it has to repeatedly communicate the same information message to the plurality of communication control units. Thus, a procedure is very complex.

SUMMARY OF THE INVENTION

It is an object of the present invention to provide a communication control method and an information transmission system for collectively transmitting and collecting information without individually sending the information of the same content to a plurality of communication control units when the same information is to be collectively sent to or collected by the plurality of communication control units. The collective transmission of the same information is first explained. In order to achieve the above object, the information transmission system of the present invention comprises a bus type communication network which has an information transmission path for transmitting control information and at least two communication control units which communicate with each other through the information transmission path. The communication control unit comprises a communication controller, a controller for generating, decoding and processing information transmitted through the communication controller, and a memory containing the information at memory addresses assigned to respective information classes. When information data is to be simultaneously transmitted or broadcasted from an optional one of the communication control units to one or more other communication control unit, the broadcasting communication control unit sends a collective information transmission message including predetermined destination addresses, which indicates information transmission from the broadcasting communication control unit to the plurality of information receiving communication control units. The information receiving communication control units connected to the information transmission path receive the collective information transmission message only to the extent of the destination addresses therein, and compare their own addresses with the destination addresses to determine whether they should receive and process the collective information transmission message or not. If it is the message is to be processed, the communication control unit receives the succeedingly transmitted collective information transmission message.

The collective collection of the same information is next explained. In order to achieve the above object, an optional communication control unit which is to collect information sends to the information transmission path a collective information transmission message containing, in its data field, memory addresses of the information to be collectively collected. The memory address designation message is received by one or more other communication control units which recognize the memory addresses of the information to be collected. The communication control units which collects the information sends to the information transmission path the information collection message. A data field of the information collection message is composed of a plurality of sets each of which sets has an address data field and a send-back information field which indicates the information to be sent back. When other communication control units receive the information collection message, they send their own addresses to the address data field of the information collection message to take part in a competition control. Each of the communication control units, which have won in the competition control, enters its own address in the address data field and also enters in the send-back information field the send-back information designated by the memory address designation message. Then, the preferential communication control units sequentially send the entered address data fields and send-back information fields to the information transmission path. Thus, as the original communication control unit, which has sent the information collection message, receives the address data fields and the send-back information fields, it can collectively collect the information by using a single message. Further, if the data field of the information collection message comprises the address data field, a byte count field, which indicates the number of bytes of information to be sent back, and the send-back information field which contains the information to be sent back, and the communication control units, from which the information is to be collected, simultaneously send the numbers of data bytes of the information to be sent back, then plural byte data can be collected in a lump. In accordance with the present invention, an optional communication control unit can effect collective transmission or collection of information to or from any other optional communication control units connected to each other through the information transmission path. Thus, the information transmission efficiency via an information transmission path is improved.

BRIEF DESCRIPTION OF THE DRAWINGS

FIG. 4 illustrates transmission of a common message.

FIG. 12 shows a configuration of a communication network and a communication control unit to which the present communication control method is applied.

FIGS. 13a-d show formats of a message for collecting information in a prior art method.

FIG. 14 shows a communication sequence when a conventional message is used.

FIGS. 17a, 17b show formats of a message for collecting information in the present invention shown in FIG. 11.

DESCRIPTION OF THE PREFERRED EMBODIMENTS

Firstly, an embodiment of the present invention for collectively transmitting information is now explained with reference to the drawings.

Figure 1:
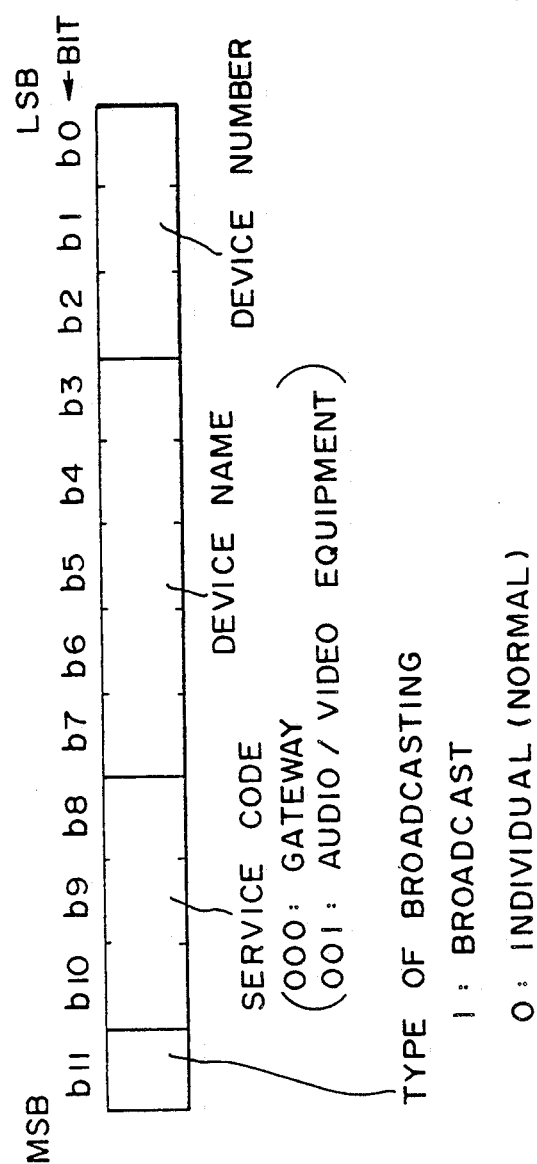
FIGS. 1 and 3a-c show formats of address codes in one embodiment of an information transmission system of the present invention.
Figure 2:
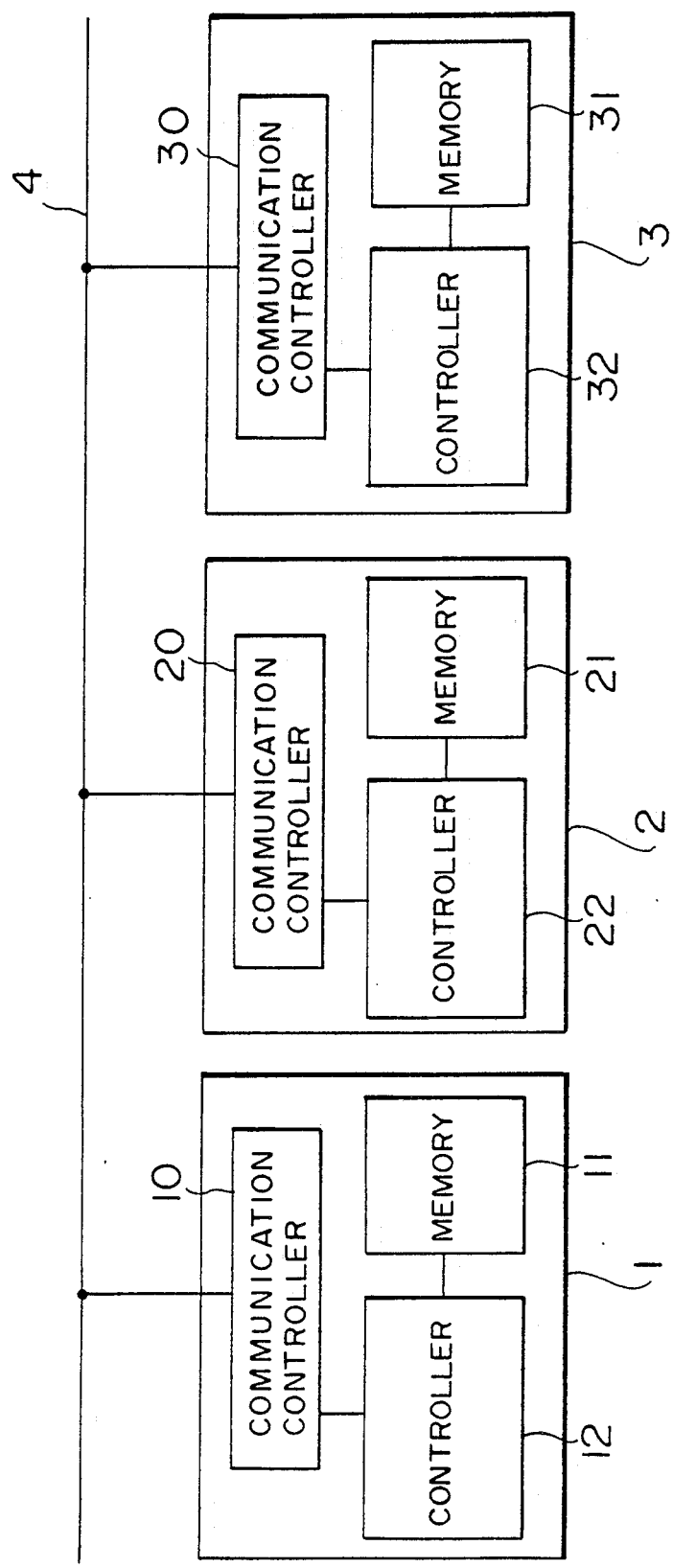
FIG. 2 shows a block diagram of the information transmission system.

FIG. 2 shows a block diagram of one embodiment of the information transmission system of the present invention. A communication control unit 1 of the information transmission system of the present embodiment comprises a communication controller 10 for transmitting an information message to an information transmission path including an information transmission line 4 and receiving an information message from the information transmission path including the information transmission line 4, a memory 11 for storing an address of a message to be received by the communication control unit, and a controller 12 for controlling those elements. Communication control units 2 and 3 have the same construction as the communication control unit 1. Numerals 20 and 30 denote communication controllers, numerals 21 and 31 denote memories, and numerals 22 and 32 denote controllers. The communication control units 1, 2 and 3 have unique unit addresses assigned thereto. FIG. 1 shows a content of an address code. The eleventh bit b11 indicates whether broadcasting is involved on not. (Here, the term "broadcasting" is used to denote multi-address calling, multi-address communication, or collective communication.) When it is "1", it indicates an address for broadcasting, and when it is "0", it indicates an individual (normal) address. The tenth to eighth bits represent a service code. For example, when they are "000", they indicate a gateway, and when they are "001", they indicate audio/video equipment. The seventh to third bits indicate a device name. Table 1 shows device names of the audio/video equipment and corresponding device codes.

In Table 1, "00000" to "11110" indicate individual devices, and "11111" indicates collective broadcasting to the audio/video equipment. The second to zero-th bits indicate device numbers. Table 1 shows the device numbers from No. 1 to No. 8 for one and the same device.

TABLE 1

| DEVICE CODE | | | | | |
|---|---|---|---|---|---|
| b7 | b6 | b5 | b4 | b3 | DEVICE NAME |
| 0 | 0 | 0 | 0 | 0 | VIDEO MONITOR (TV) |
| 0 | 0 | 0 | 0 | 1 | AUDIO AMPLIFIER |
| 0 | 0 | 0 | 1 | 0 | VIDEO SOURCE SELECTOR |
| 0 | 0 | 0 | 1 | 1 | AUDIO SOURCE SELECTOR |
| 0 | 0 | 1 | 0 | 0 | VTR |
| 0 | 0 | 1 | 0 | 1 | VIDEO TUNER |
| 0 | 0 | 1 | 1 | 0 | VIDEO PLAYER |
| 0 | 0 | 1 | 1 | 1 | VIDEO CAMERA |
| 0 | 1 | 0 | 0 | 0 | TEXT DECODER |
| 0 | 1 | 0 | 0 | 1 | DISPLAY ON SCREEN |
| 0 | 1 | 0 | 1 | 0 | VIDEO PRINTER |
| 0 | 1 | 0 | 1 | 1 | BROADCAST FAX |
| 0 | 1 | 1 | 0 | 0 | VIDEO EFFECTS DEVICE |
| 0 | 1 | 1 | 0 | 1 | Undefined |
| 0 | 1 | 1 | 1 | 0 | Undefined |
| 0 | 1 | 1 | 1 | 1 | Undefined |
| 1 | 0 | 0 | 0 | 0 | AUDIO TUNER |
| 1 | 0 | 0 | 0 | 1 | AUDIO RECORDER |
| 1 | 0 | 0 | 1 | 0 | CD PLAYER |

TABLE 1-continued

| DEVICE CODE | | | | | |
|---|---|---|---|---|---|
| b7 | b6 | b5 | b4 | b3 | DEVICE NAME |
| 1 | 0 | 0 | 1 | 1 | ANALOGUE AUDIO DISC PLAYER |
| 1 | 0 | 1 | 0 | 0 | AUDIO EFFECTOR |
| 1 | 0 | 1 | 0 | 1 | Undefined |
| 1 | 0 | 1 | 1 | 0 | Undefined |
| 1 | 0 | 1 | 1 | 1 | Undefined |
| 1 | 1 | 0 | 0 | 0 | A/V PERSONAL COMPUTER |
| 1 | 1 | 0 | 0 | 1 | A/V CONTROLLER |
| 1 | 1 | 0 | 1 | 0 | CD ROM |
| 1 | 1 | 0 | 1 | 1 | Undefined |
| 1 | 1 | 1 | 0 | 0 | TIMER |
| 1 | 1 | 1 | 0 | 1 | Undefined |
| 1 | 1 | 1 | 1 | 0 | Undefined |
| 1 | 1 | 1 | 1 | 1 | Collective broadcasting |

Figure 3A:
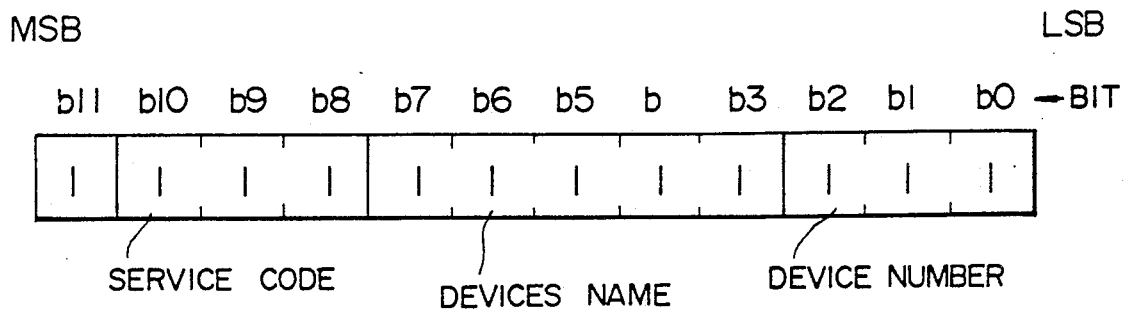
Figure 3B:
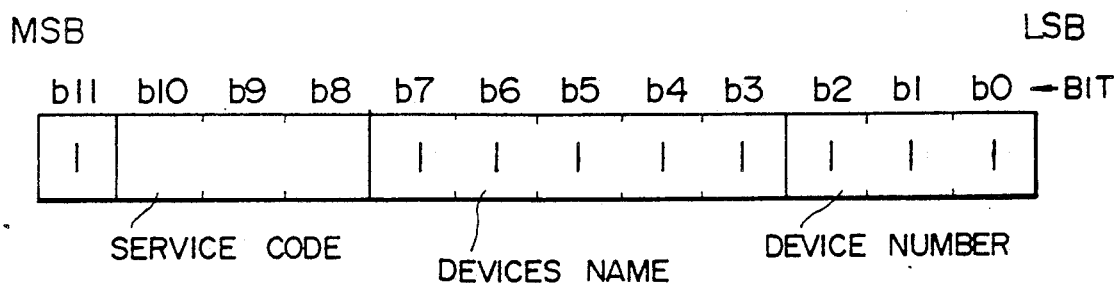
Figure 3C:
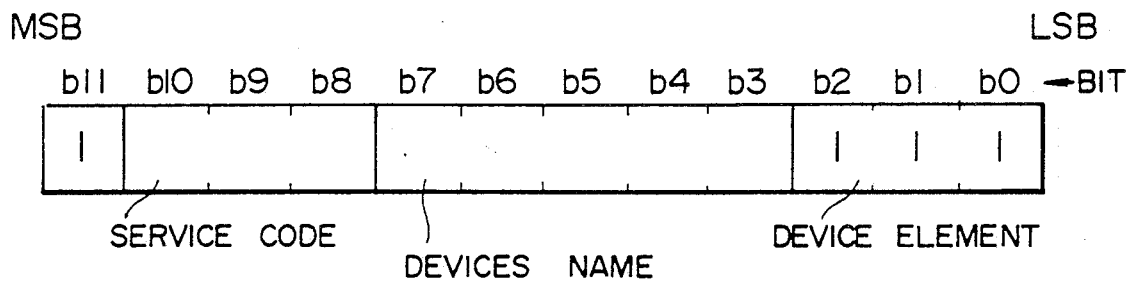
Figure 9:
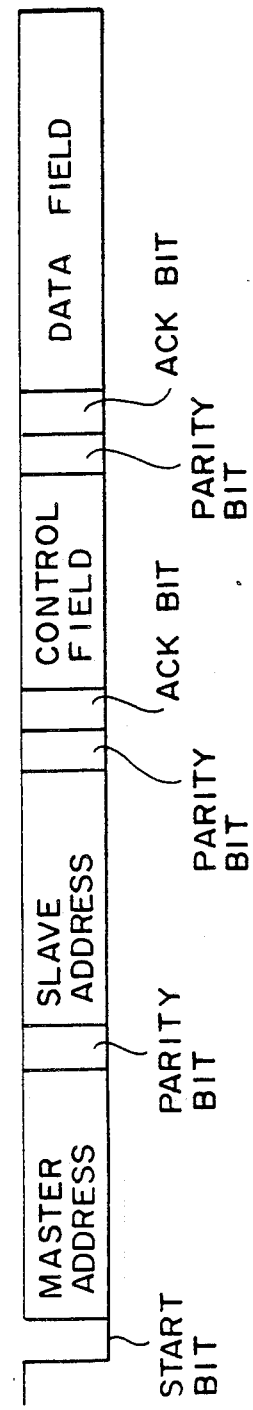
FIG. 9 shows a format of an information message used in the prior art and present information transmission systems.

In accordance with the address code configuration described above, the unit address of the communication control unit 1 is set to "1E0 (HEX)", the unit address of the communication control unit 2 is set to "120 (HEX)", and the unit address of the communication control unit 3 is set to "1C0 (HEX)". The format of the information message is the same as that shown in FIG. 9. In the present embodiment, in the one-to-one communication mode, the broadcasting bit b11 in FIG. 1 is set to "0", and the information message is transmitted in the same manner as in the prior art system. In a one-to-plural communication mode, that is, in the broadcasting mode, the bit b11 in FIG. 1 is set to "1". There are three types in the broadcasting mode, that is, collective broadcasting to all communication control units connected to the information transmission line 4, service group broadcasting to the communication control units belonging to a service group designated by the service code, and device group broadcasting to the communication control units belonging to a device group designated by the service code and the device name. FIG. 3a shows an address code for the collective broadcasting. It is "FFF (HEX)". FIG. 3b shows an address code for the service group broadcasting. All bits other than the service code are set to "1". FIG. 3c shows an address code for the device group broadcasting. The bit b11 is set to "1" and the bits b2 to b0 are set to "1".

The communication method in the information transmission system thus constructed is explained. The one-to-one communication mode is the same as that of the prior art communication method, and the explanation thereof is omitted. The transmission of the information message from the communication control unit 1 to all other communication control units 2 and 3 through the information transmission line 4 is explained.

The communication control units 1, 2 and 3 store the slave addresses to be received and processed in the memories 11, 21 and 31, respectively. For example, the communication control unit 1 stores the individual address "1E0(HEX)", collective broadcasting address "FFF (HEX)", service group broodcasting address "9FF (HEX)" and device group broadcasting address "9E7 (HEX)" in the memory, the communication control unit 2 stores the individual address "120 (HEX)", collective broadcasting address "FFF (HEX)", service group broadcasting address "9FF (HEX)" and device group broadcasting address "927 (HEX)" in the memory, and the communication control unit 3 stores the individual address "1C0 (HEX)", collective broadcasting address "FFF (HEX)", service group broadcasting address "9FF (HEX)" and device group broadcasting address "9C7 (HEX)" in the memory.

Figure 5:
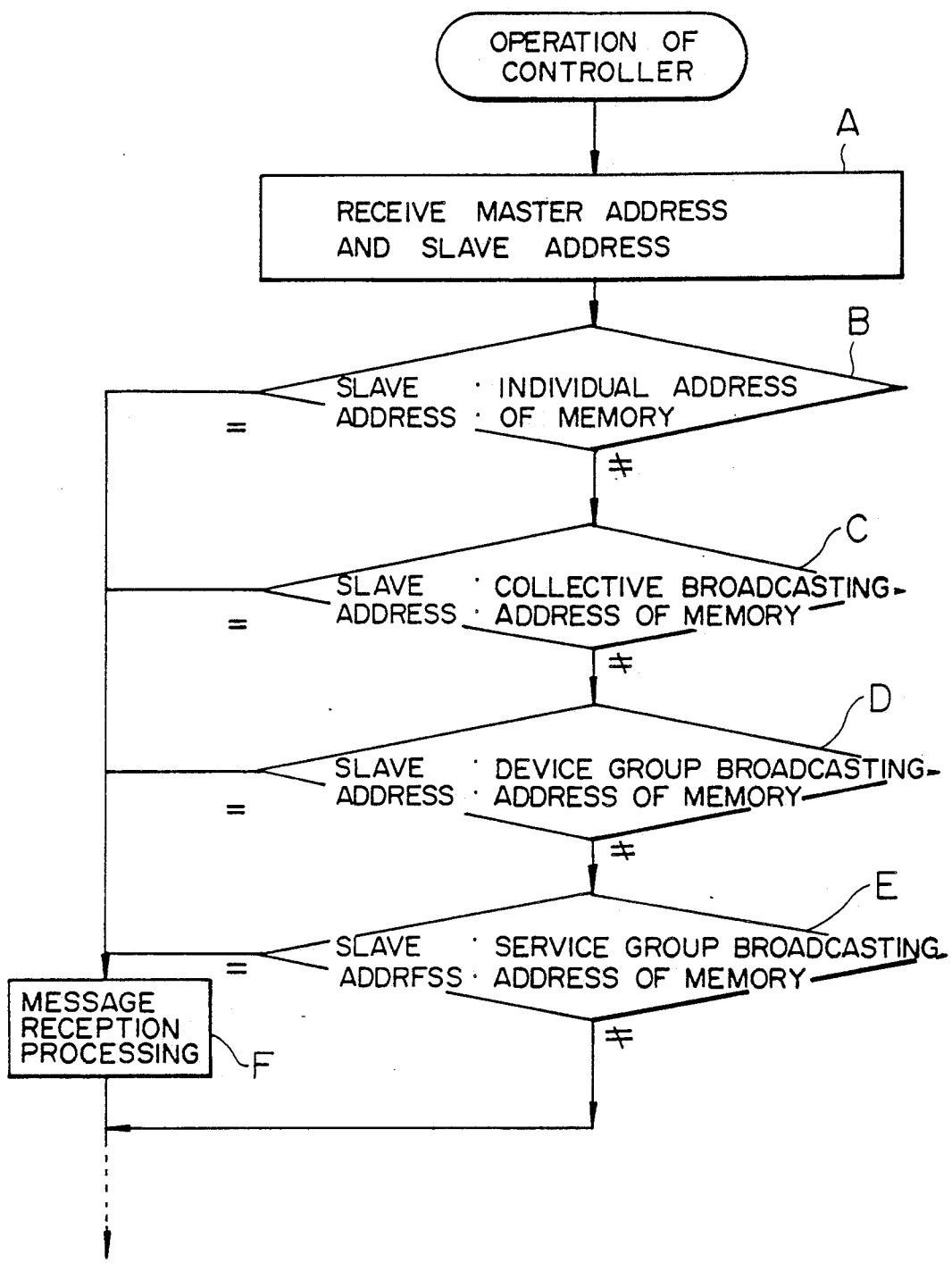
FIG. 5 shows a flow chart of an operation of a controller of a receiving communication control unit in the information transmission system.

When the communication control unit 1 is to broadcast to the communication control units 2 and 3 having the same service group address, the communication control unit 1 generates the information message having the codes of the master address "1E0 (HEX)" and the slave address "9FF (HEX)" by the controller 12, and sends the start bit, master address, parity bit thereof, slave address and parity bit thereof from the communication controller 10 to the communication control units 2 and 3 through the information transmission line 4, as shown in FIG. 4. When the communication control units 2 and 3 detect the start bit, the communication controllers 20 and 30 thereof star the receiving operations. The communication control unit 2 receives the master address, parity bit thereof, slave address and parity bit thereof through the communication controller 20. If they are correctly received without asynchronization, the controller 22 checks the slave address and decides whether the information message is to be received or not. FIG. 5 shows the process in the controller 22.

When the controller 22 receives the master address and the slave address (step A), it determines whether the received slave address "9FF (HEX)" coincides with the individual address "120 (HEX)" stored in the memory 21 (step B). Since it does not coincide in this example, it determines whether the received slave address "9FF (HEX)" coincides with the collective broadcasting address "FFF (HEX)" stored in the memory 21 (step C). Since it also does not coincide, it determines whether the received slave address "9FF (HEX)" coincides with the device group broadcasting address "927 (HEX)" stored in the memory 21 (step D). Since it also does not coincide, it determines whether the received slave address "9FF (HEX)" coincides with the service group broadcasting address "9FF (HEX)" stored in the memory 21 (step E). Since it coincides, the message reception is processed (step F). The ACK signal for the master address and the slave address is not sent at this time, but the process is delayed for that period. When the communication control unit 1 has conducted broadcasting communication, it does not confirm the ACK signal for the slave address but sends the control field and the parity bit thereof without performing the confirmation of the ACK signal, and then sends the data field. The communication control unit 2 receives those messages. The communication control unit 3 also receives the messages in the same way as the communication control unit 2 does, and receives the information message of the service group broadcasting having the slave address "9FF (HEX)".

In this manner, one information message sent from the communication control unit 1 can be simultaneously received by the communication control units 2 and 3.

Figure 6:
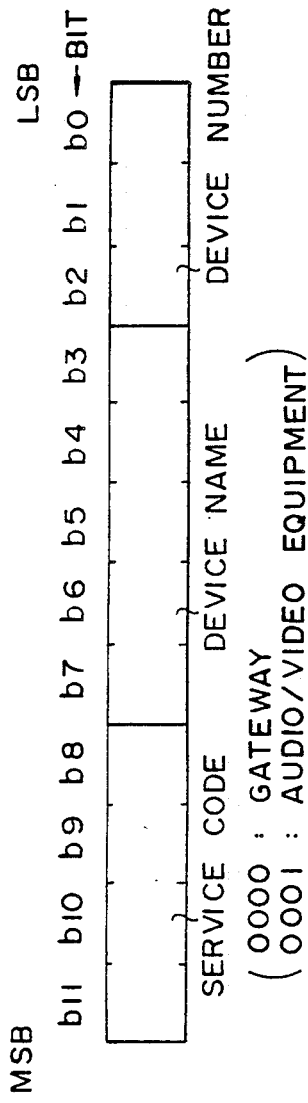
FIG. 6 shows a format of an address in another embodiment of the information transmission system of the present invention.
Figure 7:
FIG. 7 shows a format of first one-byte data of a data field in the information transmission system.
Figure 8:
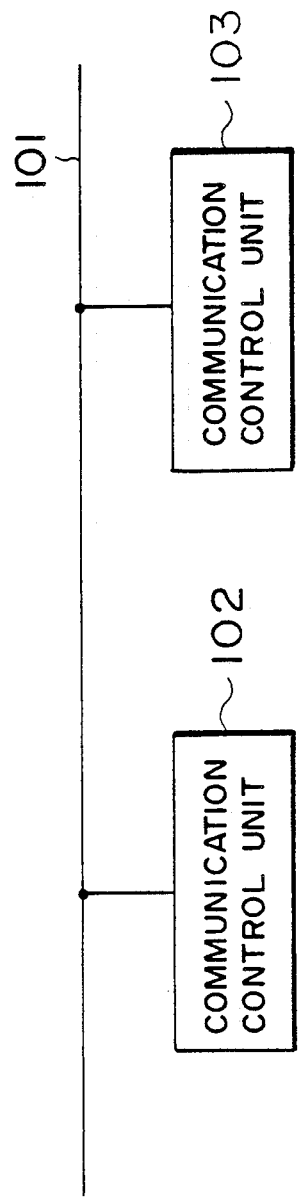
FIG. 8 shows a block diagram of a prior art information transmission system.

Another embodiment of the present invention is explained. The configuration of the information transmission system is the same as that shown in FIG. 2. FIG. 6 shows a content of an address code. The eleventh to eighth bits represent a service code. When they are "0000", they indicate a gateway, and when they are "0001", they indicate an audio/video equipment. The seventh to third bits and the second to 0-th bits represent the device name and the device number, respectively, as they are in the previous embodiment. When the eleventh to 0-th bit are all "1", they represent the address for the collective broadcasting to all communication control units connected to the information transmission line 4. The format of the information message is the same as that shown in FIG. 9. In the present embodiment, in the one-to-one communication mode, the slave address contains the individual address of the destination as it does in the prior art system. In the one-to-plural communication mode, that is, in the broadcasting mode, the slave address, which indicates the collective broadcasting address, is used. When the collective broadcasting address is used as the slave address, the first one byte of the date field indicates the broadcasting group. The individual address is divided into eight groups, groups 0 to 7, and when the bit for one group is "1", the message is broadcasted to that group, and when it is "0", the broadcasting is not effected. In the present embodiment, the communication control units 1, 2 and 3 of FIG. 2 are assigned to group 0.

The communication method in the information transmission system thus constructed is explained. The communication method in the one-to-one communication mode is the same as that of the prior art system and the explanation thereof is omitted. The transmission of the information message from the communication control unit 1 to the communication control units 2 and 3 connected to the information transmission line 4 is explained.

At the start-up of the system, the communication control units 1, 2 and 3 store the collective broadcasting address "FFF (HEX)" which is the slave address of the information message to be received, and the individual address in the memories 11, 21 and 31, respectively. The communication control unit 1 generates in the controller 12 the information message having the unit address "1E0 (HEX)" of the communication control unit 1 as the master address, the slave address "FFF (HEX)" which indicates the collective broadcasting and the first byte code "01 (HEX)" of the data field showing the addressing to the group 0, respectively, and sends the information message from the communication controller 10 to the information transmission line 4. The communication control units 2 and 3 detect the start bit of the information message and start the receiving operations in the communication controllers 20 and 30, respectively. The controller 22 of the communication control unit 2 receives the master address, parity bit thereof, slave address and parity bit thereof through the communication controller 20. If it correctly receives the information message, it compares the slave address "FFF (HEX)" of the information message received by the controller 22 with the address of the message to be received stored in the memory 21, and determines whether to continue the receiving operation or not. The memory 21 contains the slave addresses "120 (HEX)" and "FFF (HEX)" of the information messages to be received. Since the slave address "FFF (HEX)" coincides, the communication control unit 2 continues to receive the information message and temporarily stores the content of the information message in the memory 21. When the data field has been received to the end, the controller 12 decide the content of the first one byte of the data field of the received information message stored in the memory 21 to determine whether the information message is addressed to the group to which it belongs. Since the code of the first byte of the data field of the received information message is "01 (HEX)" and b0=1, that is, since it is addressed to the group 0, the controller 12 conducts the process designated by the content of the data field. The communication control unit 3 also conducts the same process, that is, it receives the information message for the group 0 sent from the communication control unit 1.

In this manner, one information message sent from the communication control unit 1 can be simultaneously received by the communication control units 2 and 3.

The collective collection of information in the present invention is next explained.

Figure 10A:
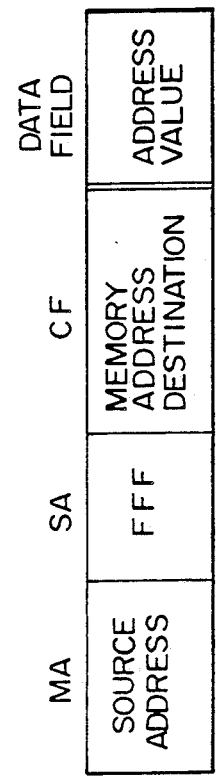
FIGS. 10a, 10b and 11a, 11b show message formats in other embodiment of the communication control method of the present invention.
Figure 10B:
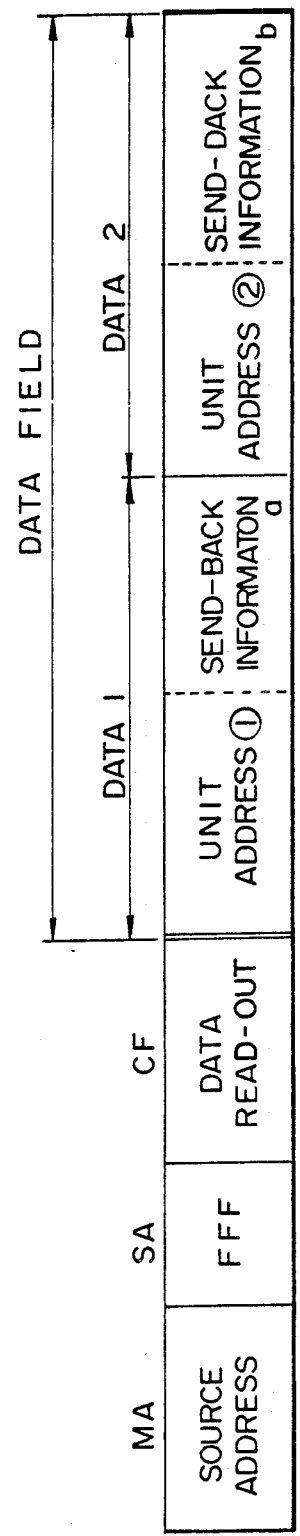
Figure 15A:
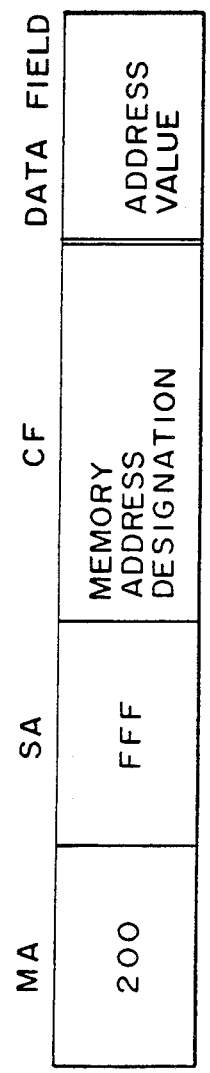
FIG. 15a, 15b show formats of a message for collecting information in the present invention.
Figure 15B:
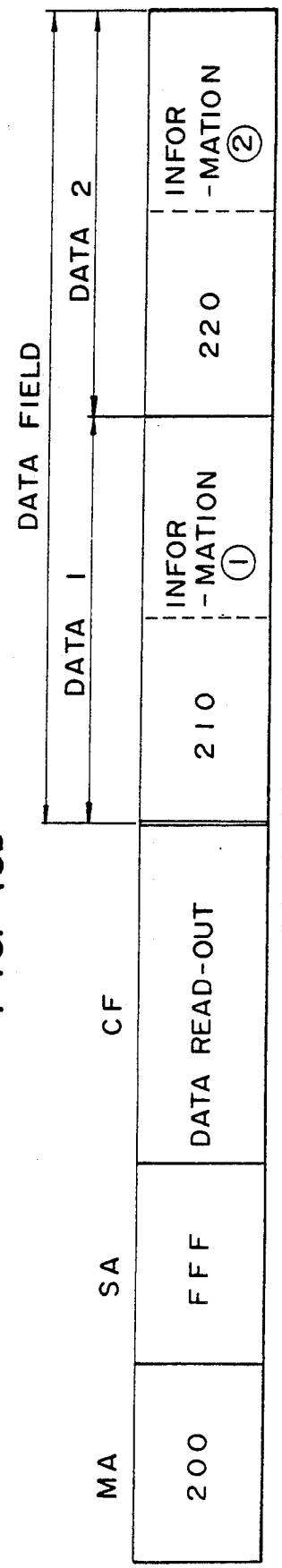
Figure 16:
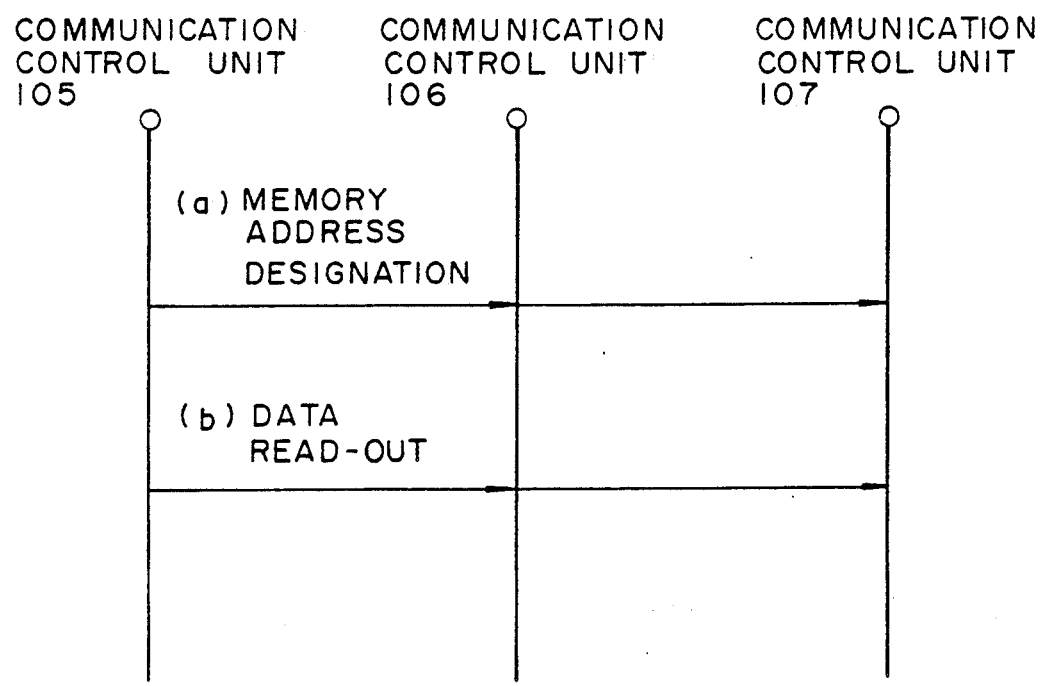
FIG. 16 shows a communication sequence when the message of FIG. 15 is used.

FIG. 10 shows a message format in an embodiment of the present invention. MA denotes a master address which is a source address, SA denotes a slave address which is a destination address, and CF denotes a control field which indicates an attribute of the message. A message shown in FIG. 10a is a memory address designation message. MA denotes a unit address of the communication control unit which collects the information, and SA contains a specific code "FFF". When this code is set, all communication control units connected to the information transmission line other than the communication control unit, which collects the information, receive the message. The collective broadcasting message explained above is used for this purpose. The service group broadcasting message or device group broadcasting message may also be used. CF contains the memory address designation code, and the data field contains the address of a memory to be read. In the message shown in FIG. 10b, MA and SA are the same as those of FIG. 10a. CR contains the data read code and the data field contains a plurality sets of data, each data set including a unit address of the communication control unit, to which the information is to be sent back, and the send-back information. In the bus type communication network shown in FIG. 12, it is assumed that the communication control unit 105 collects the information ① stored in the information memory 108 of the communication control unit 106 and the information ② stored in the information memory 109 of the communication control unit 107. FIGS. 15 and 16 show communication message and communication sequence when the message format shown in FIG. 10 is used. In FIG. 15a, the communication control unit 105 for collecting the information sends to the information transmission line 104 the information collection message having the specific collective broadcasting address code "FFF" in the field SA and the memory address designation code in the field CF. All communication control units connected to the information transmission line 104 other than the communication control unit 105, that is, the communication control units 106 and 107 receive the message, recognize it as the memory address designation message, and read the content of the memory having the address designated by the data field. The contents of the memory are the information ① for the communication control unit 106, and the information ② for the communication control unit 107. Then, the information is collected by the information collection message of FIG. 15b. SA contains the specific collective broadcasting address "FFF" so that all communication control units 106 and 107 receive the message. When the communication control unit receives the message, it detects the data read code in the field CF, and sends the unit address data of its own communication control unit while performing competition control at the head of the data field. The communication control units 106 and 107 concurrently send the unit addresses of their own units and compare the transmitted data with the data on the information transmission line 104. If a plurality of communication control units concurrently send data to the information transmission line 104, the data "0" wins against the data "1" because the communication control units are connected to the information transmission line 104 in a wired-and manner. When the unit address data is concurrently sent to the information transmission line 104, the communication control unit, which has sent a smaller value of unit address, wins in the competition and acquires a right to succeedingly send the data. Since the unit address of the communication control unit 106 is smaller than that of the communication control unit 107, the communication control unit 106 wins, and it sends back to the information transmission line 104 data 1 comprising the unit address "210" and the information ①, which the communication control unit 106 is to send back, in one set. The communication control unit 107, which has lost in the competition, sends the unit address to the information transmission line 104 succeeding to the data 1 to retry the competition. Since there is no other communication control unit which is to send back information to the information transmission line 104, the communication control unit 107 wins and it sends back to the information transmission line 104 data 2 comprising the unit address 220 of its own unit and the information ② to be sent back, in one set. The communication sequence in the embodiment of the present invention is shown in FIG. 16. The memory address designation message and the data read message are concurrently received by the communication control units 106 and 107.

Figure 11A:
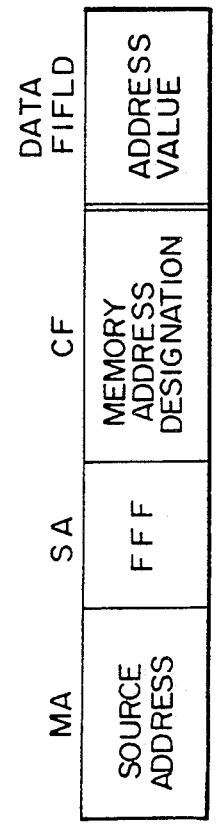
Figure 11B:
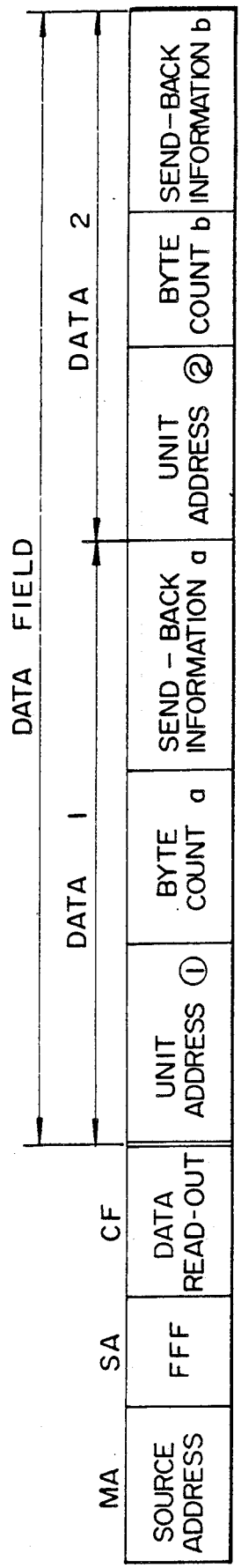

A message format in another embodiment of the present invention is shown in FIG. 11. FIG. 11a shows a message similar to that of FIG. 10a. In FIG. 11b, a data field contains a unit address of the communication control unit which is to send back information, a byte count indicating the number of bytes of the send-back information, and the send-back information. The communication control unit, which has the send-back information in the data field, places the unit address of its own unit and the number of bytes of the send-back information, which it is to send back, ahead of the send-back information to thereby form the data field. The data field comprises send-back data which have been sent back from a plurality of communication control units. In the communication network shown in FIG. 12, it is assumed that the communication control unit 105 collects the information ① of the communication control unit 106 and the information ② of the communication control unit 107. A communication message, which complies with the message format of FIG. 11, is shown in FIG. 17. A memory address designation message shown in FIG. 17a is similar to that of FIG. 15a. Succeeding to the use of the message of FIG. 17a, an information collection message of FIG. 17b is used to collect information. When the communication control units receive the message, competition control is effected therebetween in the unit address fields, as they did in FIG. 15b, then, the preferential communication control units designate in the byte count fields the numbers of bytes of the send-back information to be sent back, and transmit the send-back information.

In accordance with the present invention, the information can be collectively transmitted and collected by using a small number of messages between an optional communication control unit and other optional communication control units. In the collective transmission mode, the transmission may be designated to a variety of destinations. In the collective collection mode, not only a single kind of information but also many kinds of information may be collected. Further, the length of information to be sent back may be variable. Thus, the present invention has great advantages in practical use.

We claim:

1. A communication control method in a bus type communication network having a plurality of communication control units connected to an information transmission path wherein a selected one of said communication control units collectively collects broadcasting information from other ones of said plurality of communication control units through said information transmission path, comprising the steps of:
   (a) transmitting, from said selected communication control unit which collects the broadcasting information, a memory address designation message to said information transmission path,
   said memory address designation message having a destination address in the message, a control field containing a specific code and a data field containing a code indicating a memory address of data to be collected,
   said code in said control field indicating an attribute of the message,
   said data field containing data to be transmitted;
   (b) receiving, by all said communication control units except said selected communication control unit which collects the broadcasting information, said memory address designation message is to be collected;
   (c) transmitting from said selected communication control unit, which collects the broadcasting information, an information collection message to said information transmission path,
   said information collection message having a destination address in the message, a control field containing a specific code, and a data field containing a plurality of sets each comprising an address data field and a send-back information field,
   said send-back information field containing the information data to be sent back;
   (d) transmitting from said communication control units, which have received said information collection message, unit address data of their own communication control units to said address data field in said information collection message to perform competition control, and preparing, in said communication control units which have won in the competition control, said address data field by using the unit address data of their own communication control units, and preparing said send-back information field by using the send-back information designated by said memory address designation message, and sequentially transmitting from each of said communication control units a set of said address data field and said send-back information field to said information transmission path; and
   (e) receiving by said selected communication control unit, which has transmitted said information collection message, said address data field and said send-back information field so that said selected communication control unit collectively collects the broadcasting information from said other communication control units by using one message,
   whereby the broadcasting information is collectively collected.

2. A communication control method in a bus type communication network having a plurality of communication control units connected to an information transmission path wherein a selected one of said communication control units collectively collects broadcasting information from said other communication control units through said information transmission path, comprising the steps of:
   (a) transmitting, from said selected communication control unit which collects the broadcasting information, a memory address designation message to said information transmission path,
   said memory address designation message having a destination address in the message, a control field containing a specific code and a data field containing a code indicating a memory address of data to be collected,
   said code in said control field indicating an attribute of the message,
   said data field containing data to be transmitted;
   (b) receiving, by all said communication control units except said selected communication control unit which collects the broadcasting information, said memory address designation message and confirming that send-back information having a memory address designated by said memory address designation message is to be collected;
   (c) transmitting from said selected communication control unit, which collects the broadcasting information, an information collection message to said information transmission path,
   said information collection message having a destination address in the message, a control field containing a specific code, and a data field containing a plurality of sets each comprising an address data field, a byte count field and a send-back information field,
   said byte count field representing the number of bytes of the information to be sent back,
   said send-back information field containing the information data to be sent back;
   (d) transmitting from said communication control units, which have received said information collection message, unit address data of their own communication control units to said address data field in said information collection message to perform competition control, and preparing, in said communication control units which have won in the competition control, said address data field by using the unit address data of their own communication control units, said byte count field by using the numbers of bytes of the send-back information designated by said memory address designation message, and said send-back information field by using the information to be sent back, and sequentially transmitting from each of said communication control units a set of said address data field, said byte count field and said send-back information field to said information transmission path; and
   (e) receiving by said selected communication control unit, which has transmitted said information collection message, said address data field, said byte count field and said send-back information field so that said selected communication control unit collectively collects the broadcasting information from said other communication control units by using one message,
   whereby the broadcasting information is collectively collected.

3. Communication control units connected to an information transmission path in a bus type communication network wherein a selected one of said communication control units collectively collects broadcasting information from said other communication control units through said information transmission path, each of said communication control units comprising:
- a communication controller;
- an information controller; and
- a memory, said communication controller communicating with those of said other communication control units through said information transmission path, said information controller generating, decoding and processing the broadcasting information transmitted through said communication controller, said memory containing the information at a memory address assigned to each information class, said communication control units thereby performing the following operational steps:

(a) generating by said information controller of said selected communication control unit, which collects the broadcasting information, a memory address designation message and transferring said message to said communication controller to transmit said message therethrough to said information transmission path, said memory address designation message having a designation address in the message, a control field containing a specific code, and a data field containing a code indicating a memory address of data to be collected, said code in said control field indicating an attribute of the message, said data field containing data to be transmitted;

(b) receiving by all said information controllers of said plural communication control units except said selected communication control unit, which collects the broadcasting information, said memory address designation message through said communication controllers thereof to confirm that sendback information containing the memory address designated in said memory address designation message is to be collected;

(c) transmitting, by said selected communication control unit, which collects the broadcasting information, an information collection message from said information controller thereof through said communication controller thereof to said information transmission path, said information collection message having a destination address in the message, a control field containing a specific code, and a data field containing a plurality of sets each comprising an address data field and a send-back information field, said send-back information field containing the information data to be sent back;

(d) transmitting from said communication controls of said communication control units, which have received said information collection message, unit address data of their own communication control units to said address data field in said information collection message to perform competition control, and preparing, in said communication controllers of said communication control units which have won in the competition control, said address data field by using the unit address data of their own communication control units, and preparing said send-back information field by using said information to be sent back, which has been designated by said memory address designation message and read out from said memories by said information controllers of said communication control units, and sequentially transmitting from said information controller of each of said communication control units, a set of said address data field and said send-back information field through said communication controllers thereof to said information transmission path; and (e) receiving, by said controller of said selected communication control unit, which has transmitted said information collection message, said address data field and said send-back information field through said communication controller thereof, and deciding the content of each of the received fields so that said selected communication control unit collectively collects the broadcasting information from said other communication control units, whereby the broadcasting information is collectively collected by using one message.

4. Communication control units connected to an information transmission path in a bus type communication network wherein a selected one of said communication control units collectively collects broadcasting information from said other communication control units through said information transmission path, each of said communication control comprising:
- a communication controller;
- an information controller, and
- a memory, said communication controller communicating with those of said other communication control units through said information transmission path, said information controller generating, decoding and processing the broadcasting information transmitted through said communication controller, said memory containing the information at a memory address assigned to each information class, said communication control units thereby performing the following operational steps:

(a) generating, by said information controller of said selected communication control unit, which collects the broadcasting information, a memory address designation message and transferring said message to said communication controller to transmit said message therethrough to said information transmission path, said memory address designation message having a designation address in the message, a control field containing a specific code, and a data field containing a code indicating a memory address of data to be collected, said code in said control field indicating an attribute of the message, said data field containing data to be transmitted;

(b) receiving by all said information controllers of said plural communication control units except said collected communication control unit, which collects the broadcasting information, said memory address designation message through said communication controllers thereof to confirm that sendback information containing the memory address designated in said memory address designation message is to be collected;

(c) transmitting, by said selected communication control unit, which collects the broadcasting information, an information collection message from said information controller thereof through said communication controller thereof to said information transmission path, said information collection message having a destination address in the message, a control field containing a specific code, and a data field containing a plurality of sets each thereof being composed of an address data field, a byte count field and a send-back information field, said byte field representing the number of bytes of the information to be sent back, said send-back information field containing the information data to be sent back;

(d) transmitting from said communication controls of said communication control units, which have received said information collection message, unit address data of their own communication control units to said address data field in said information collection message to perform competition control, and preparing, in said communication controllers of said communication control units which have won in the competition control, said address data field by using the unit address data of their own communication control units, and preparing said send-back information field and said byte count field, respectively, by reading out from said memories the information to be sent back, which has been designated by said memory address designation message, and by using the information to be sent back and the number of bytes thereof, and sequentially transmitting from said information controller of each of said communication control units, a set of said address data field, said byte count field and said send-back information field through said communication controllers thereof to said information transmission path; and (e) receiving, by said information controller of said selected communication control unit, which has transmitted said information collection message, said sets of said address data field, said byte count field and said send-back information field through said communication controller thereof, and deciding the content of each of the received fields so that said selected communication control unit collectively collects the broadcasting from said other communication control units, whereby the broadcasting information is collectively collected by using one message.

5. An information transmission system including an information transmission path for transmitting broadcasting information therethrough and at least two communication control units for communicating with each other through said information transmission path wherein a selected one of said communication control units collectively collects the broadcasting information from one or more other communication control units, each of said communication control units comprising a communication controller, and information controller and a memory, said communication controller communicating with those of said other communication control units through said information transmission path, said information controller generating, a decoding and processing the information transmitted through said communication controller, said memory containing the information at a memory address assigned to each information class, said information transmission system thereby performing the following operations:

(a) transmitting from said selected communication control unit, which collects the broadcasting information, a memory address designation message to said information transmission path, said memory address designation message having a destination address in the message, a control field containing a specific code, and a data field containing a code indicating a memory address of data to be collected, said code in said control field indicating an attribute of the message, said data field containing data to be transmitted;

(b) receiving by all said communication control units except said selected communication control unit, which collects the broadcasting information, said memory address designation message through said communication controllers thereof to confirm by said information controllers thereof that send-back information containing the memory address designated in said memory address designation message is to be collected;

(c) transmitting from said information controller of said selected communication control unit, which collects the broadcasting information, an information collection message through said communication controller thereof to said information transmission path, said information collection message having a destination address in the message, a control field containing a specific code, and a data field containing a plurality of sets each composed of an address data field and a send-back information field;

said send-back information field containing the information data to be sent back;

(d) transmitting from said information controllers of said communication control units, which have received said information collection message, unit address data of their own communication control units to said address data field in said information collection message to perform composition control, and preparing, in said information controllers of said communication control units which have won in the competition control, said address data field by using the unit address data of their own communication control units, and preparing said send-back information field by using said information to be sent back, which has been designated by said memory address designation message and read out from said memories by said information controllers of said communication control units, and sequentially transmitting from said information controller of each of said communication control units, a set of said address data field and said send-back information field through said communication controllers thereof to said information transmission path; and (e) receiving, by said information controller of said selected communication control unit, which has transmitted said information collection message, said sets of said address data field and said send-back information field through said communication controller thereof, and deciding the content of each of the received fields so that said selected communication control unit collectively collects the broadcasting information from said other communicating control units, whereby the broadcasting information is collectively collected by using one message.

6. An information transmission system including an information transmission path for transmitting broadcasting information therethrough and at least two communication control units for communicating with each other through said information transmission path wherein a selected one of said communication control units collectively collects the broadcasting information from one or more other communication control units, each of said communication control units comprising a communication controller, and information controller and a memory, said communication controller communicating with those of said other communication control units through said information transmission path, said information controller generating, a decoding and processing the information transmitted through said communication controller, said memory containing the information at a memory address assigned to each information class, said information transmission system thereby performing the following operations:

(a) transmitting from said selected communication control unit, which collects the broadcasting information, a memory address designation message to said information transmission path, said memory address designation message having a destination address in the message, a control field containing a specific code, and a data field containing a code indicating a memory address of data to be collected, said code in said control field indicating an attribute of the message, said data field containing data to be transmitted;

(b) receiving by all said communication control units except said selected communication control unit, which collect the broadcasting information, said memory address designation through said communication controllers thereof to confirm by said information controllers thereof that send-back information containing the memory address designated in said memory address designation message is to be collected;

(c) transmitting from said information controller of said selected communication control unit, which collects the broadcasting information, an information collection message through said communication controller thereof to said information transmission path, said information collection message having a destination address in the message, a control field containing a specific code, and a data field containing a plurality of sets each comprising an address data field, a byte count field and a send-back information field;

said byte count field representing the number of bytes of the information to be sent back;

said send-back information field containing the information data to be sent back;

(d) transmitting from said information controllers of said communication control units, which have received said information collection message, unit address data of their own communication control units to said address data field in said information collection message to perform composition control, and preparing, in said information controllers of said communication control units which have won in the competition control, said address data field by using the unit address data of their own communication control units, and preparing said send-back information field and said byte count field, respectively, by reading out from said memories the information to be sent back, which information has been designated by said memory address designation message, and by using the information to be sent back and the number of bytes thereof, and sequentially transmitting from said information controller of each of said communication control units, a set of said address data field, said byte count field and said send-back information field through said communication controllers thereof to said information transmission path; and (e) receiving, by said information controller of said selected communication control unit, which has transmitted said information collection message, said sets of said address data field, said byte count field and said send-back information field through said communication controller thereof, and deciding the content of each of the received fields so that said selected communication control unit collectively collects the broadcasting information from said other communicating control units, whereby the broadcasting information is collectively collected by using one message.

* * * * *